United States Patent
Li et al.

(10) Patent No.: US 9,843,825 B1
(45) Date of Patent: Dec. 12, 2017

(54) DISTRIBUTED AND SYNCHRONIZED MEDIA SWITCHING

(71) Applicant: Apple Inc., Cupertino, CA (US)

(72) Inventors: Zhenheng Li, San Jose, CA (US); David P. Saracino, San Francisco, CA (US); Roger N. Pantos, Cupertino, CA (US); Simon Goldrei, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/179,476

(22) Filed: Jun. 10, 2016

(51) Int. Cl.
| | |
|---|---|
| *H04N 7/173* | (2011.01) |
| *H04N 21/2343* | (2011.01) |
| *H04L 29/06* | (2006.01) |
| *H04N 21/2187* | (2011.01) |
| *H04N 21/233* | (2011.01) |
| *H04N 21/81* | (2011.01) |
| *H04N 21/433* | (2011.01) |
| *H04N 21/24* | (2011.01) |
| *H04N 21/242* | (2011.01) |
| *H04N 21/2662* | (2011.01) |
| *H04N 21/6332* | (2011.01) |

(52) U.S. Cl.
CPC ... *H04N 21/23439* (2013.01); *H04L 65/4084* (2013.01); *H04L 65/602* (2013.01); *H04N 21/2187* (2013.01); *H04N 21/233* (2013.01); *H04N 21/2402* (2013.01); *H04N 21/242* (2013.01); *H04N 21/2662* (2013.01); *H04N 21/4331* (2013.01); *H04N 21/6332* (2013.01); *H04N 21/8106* (2013.01)

(58) Field of Classification Search
CPC ......... H04N 21/2343; H04N 21/23439; H04N 21/242; H04N 21/433
See application file for complete search history.

(56) References Cited

U.S. PATENT DOCUMENTS

| | | | |
|---|---|---|---|
| 7,136,398 B1* | 11/2006 | Huart | H04M 3/567 370/260 |
| 2007/0230913 A1* | 10/2007 | Ichimura | H04N 5/04 386/201 |
| 2011/0054886 A1* | 3/2011 | Ae | G10H 1/0091 704/207 |
| 2014/0189052 A1* | 7/2014 | Gholmieh | H04L 67/02 709/217 |
| 2015/0116595 A1* | 4/2015 | Nakamura | H04N 21/4331 348/523 |
| 2016/0234078 A1* | 8/2016 | Jana | H04L 67/02 |
| 2016/0366202 A1* | 12/2016 | Phillips | H04L 43/08 |

* cited by examiner

*Primary Examiner* — James R Marandi
(74) *Attorney, Agent, or Firm* — Robert L. Hails; Baker Hostetler LLP

(57) ABSTRACT

A method of switching media output includes receiving a first variant of a media item with a player, transmitting the first variant to a secondary device, and upon determining a change in operating conditions, switching from the first variant of the media item to a second variant of the media item by estimating a time to perform the switch to the second variant, transmitting to the secondary device a notification of a time to switch from the first variant to the second variant, and transmitting the second variant to the secondary device.

19 Claims, 4 Drawing Sheets

DISTRIBUTED AND SYNCHRONIZED MEDIA SWITCHING

BACKGROUND

HTTP Live Streaming (HLS) is a media streaming protocol which is adaptive to multi-bit media playback. Media may exist in multiple quality tiers which can be rendered across multiple devices depending on a variety of circumstances. When circumstances change, it may be desirable to change an output from one quality tier to another. When using multiple output devices, it is often desirable to have synchronized rendering of common media distributed across each device. Televisions, speakers, computers, and other devices may render the same media or portions of the same media at the same time, but synchronization can be lost, for example, when switching from one quality tier to another.

Some media rendering systems and methods may fail to properly render media as bitrates for the connections delivering the media change, system or device parameters change, or other reasons causing a desired change in media format or quality. Such failures can lead to unsynchronized media output. Unsynchronized media output could result in audio and video playing at different times across multiple devices, causing poor mixing of sound, sound not synchronized with corresponding video, spoilers of video output on multiple devices, and other undesirable outcomes.

Accordingly, what is needed is a system and method for distributed and synchronized media switching.

DETAILED DESCRIPTION

The disclosure includes a method of switching media output, the method including receiving a first variant of a media item with a player, transmitting the first variant to a secondary device, and upon determining a change in operating conditions, switching from the first variant of the media item to a second variant of the media item by estimating a time to perform the switch to the second variant, transmitting to the secondary device a notification of a time to switch from the first variant to the second variant, and transmitting the second variant to the secondary device. The systems and methods disclosed herein allow for synchronized switching of different media variants.

Figure 1:
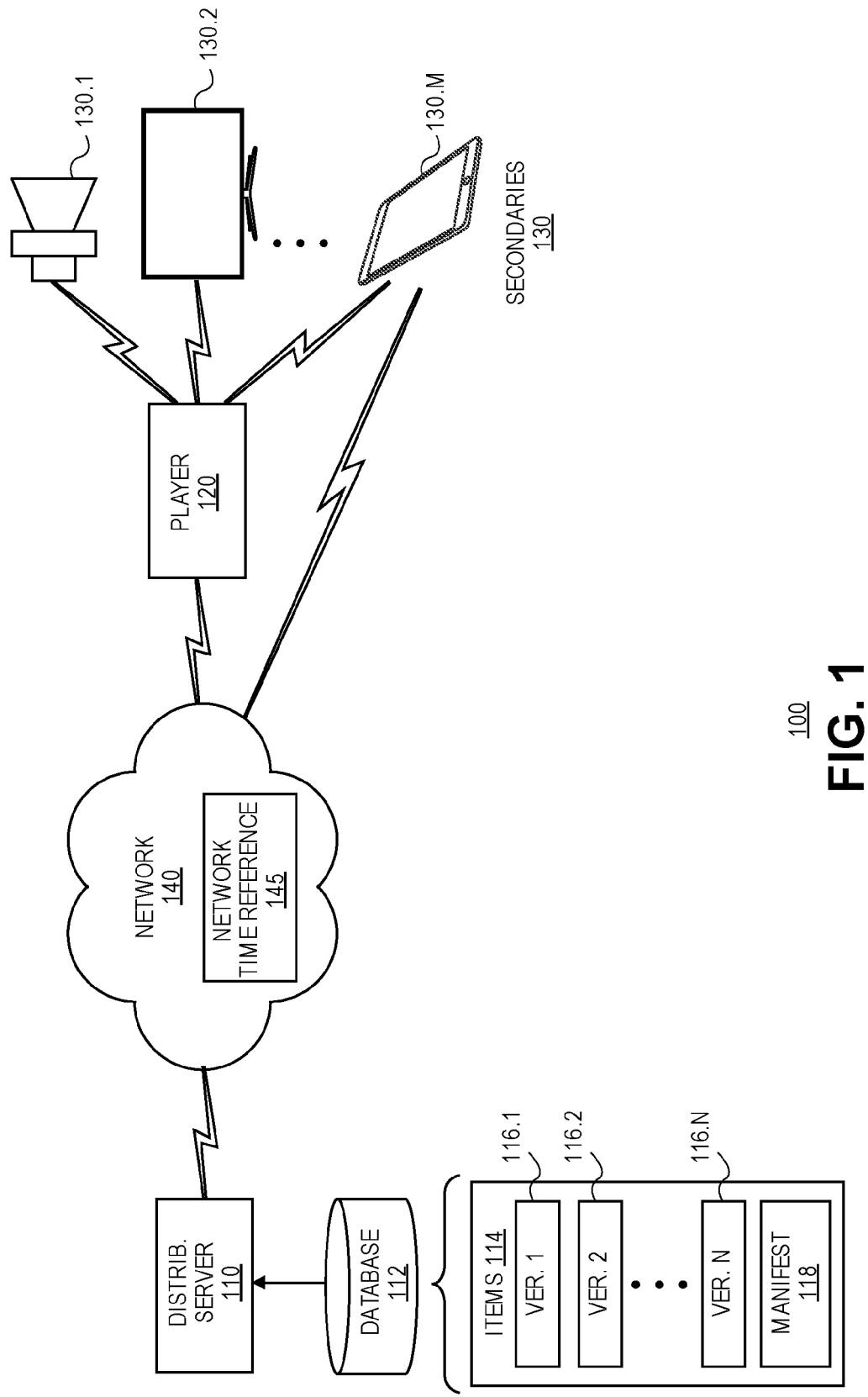
FIG. 1 illustrates a system for switching and synchronizing media output, according to an aspect of the disclosure.

FIG. 1 illustrates a system 100 for switching and synchronized media output. The system 100 may include a distribution server 110, a primary device (such as a player) 120, and one or more secondary devices 130 provided in communication by a network 140.

The distribution server 110 may store or have access to media items such as video, audio, images, and the like, which can be stored in one or more databases 112 associated with the distribution server 110. A single media item 114 may include different coded variants (ver. 116.1-116.N) of the media, each variant representing source media content having different types of coding applied thereto. For example, the different variants 1-N may represent source media using different coded bitrates (which often impose different qualities to recovered video), different frame sizes, or different frame rates, among other characteristics. The variants may be parsed into "chunks" of predetermined duration, which may be requested individually by devices 120, 130 and delivered by the distribution server 110. Thus, if a given device 120, 130 encounters performance issues that make rendering of a given variant (e.g., ver. 1) impractical, due for example, to bandwidth limitations of a network 140 or resource constraints at the device 120, 130, the device 120, 130 may request another variant that has lower bitrate or decoding complexity. Similarly, if the device 120, 130 is allocated increasing bandwidth or processing resources, the device 120, 130 may request a higher-bitrate variant of a media item 112, which typically yields recovered video data of higher quality.

The distribution server 110 may also store a manifest file 118 for each media item 114 which describes the available variants (ver. 1-N) stored for the media item 114. The distribution server 110 may deliver the manifest file 116 to a player 120 and/or secondary device 130 on request, prior to delivery of chunks. Based on this information, the player 120 may select a particular variant to receive over the network 140. The selection of the variant may be made by a user or by the player 120 in response to a user command or changing condition (e.g., changes in network bandwidth or processor availability of the device). When a request for a new or different variant of the media is issued, the player 120 or the distribution server 110 may determine how to transition from the current variant being transmitted to the player 120 to the requested variant. In making the determination, the player 120 or the distribution server 110 may select which channels and chunks of the variant should be sent to the player 120.

The player 120 may be a user device such as a computer, phone, tablet, stereo, television, speaker and receiver adapter, or any type of device or controller able to transmit and/or render media. The player 120 may determine, based on a bitrate between the player 120 and network 140 and/or between the player 120 and any secondary device 130, which variant of media to render. For example, a higher bitrate may allow rendering a higher quality variant of the media than a lower bitrate may allow. Changing bitrates can cause the player 120 to switch variants of the media to render. Media may be rendered at the player 120 and/or any secondary devices 130 associated with the player 120. The player 120 may receive media from the distribution server 110 and transmit it to the secondary devices 130. Alternatively, the player 120 and secondary device 130 may be integrated into a common unit such as computer, phone, tablet, or the like. In another alternative, the player 120 may be a "silent primary" device which does not render any media, but transmits media to the secondary devices 130 to be rendered, and which controls the switching of media variants.

Secondary devices 130.1-103.M may be speakers, televisions, tablets, smartphones, and other devices capable of rendering media item 114. A secondary device 130 may communicate directly with the network 140 or may be controlled by a player 120. Different secondary devices may connect directly or indirectly with the network 140. For example, secondary devices 130.1 and 130.2 may be completely controlled by the player 120 while secondary device 130.M may communicate directly with the network 140.

The distribution server 110 and the player 120 may connect to the network 140 and/or to each other via a communication channel. The network 140 may include the network time reference 145, which may be available to each player 120 and secondary device 130. The player 120 may connect to the distribution server 110 via the network 140 to receive the manifest file 118 and variants of the media items available at the distribution server 110.

In another aspect, multiple devices may communicate using peer-to-peer connections. For example, multiple phones, tablets, or computers may communicate with each other when no WiFi connection is available. In such an example, one device 120 may be the player 120 distributing content to the other devices which serve as secondary devices 130.

Figure 2:
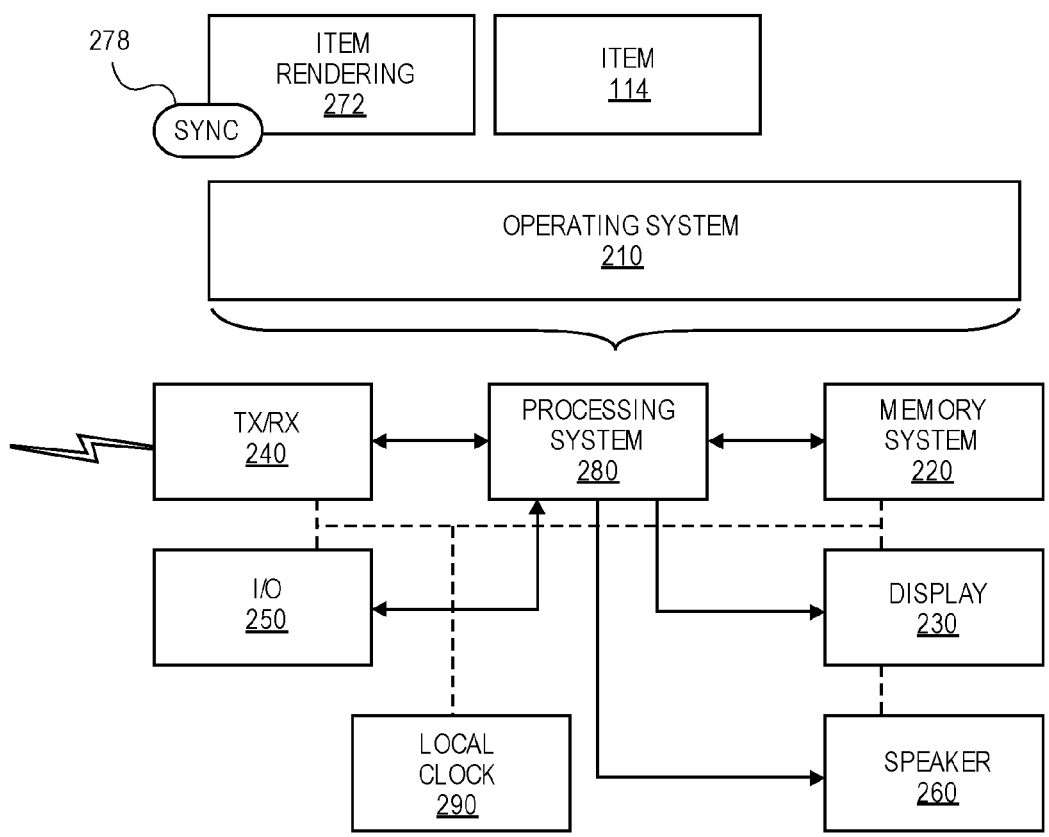
FIG. 2 is a functional block diagram of a device for switching and synchronizing media output, according to an aspect of the disclosure.

FIG. 2 is a functional block diagram of a device 200 according to an embodiment of the disclosure. The device 200 could be a player 120 or secondary device 130 (FIG. 1). The device 200 may include a processing system 280, memory system 220, display 230, transceiver (TX/RX) 240, and input/output (I/O) units 250.

The processing system 280 may control operation of the device 200 by causing the device 200 to interact with other entities, such as players 120 and/or secondary devices 130 (FIG. 1), to synchronize playback. The memory system 220 may store instructions that the processing system 280 may execute and also may store media item data generated therefrom. The architecture of the processing system 280 may include a central processing unit; it may also include graphics processors, digital signal processors, and application specific integrated circuits (not shown) as may be suitable for individual media item 114 needs. The architecture of the memory system 220 may be suitable for individual media item 114 needs. The architecture of the memory system 220 may also vary from device to device. Typically, the memory system 220 may include one or more electrical, optical, and/or magnetic storage devices (not shown). The memory system 220 may be distributed throughout the processing system 280. For example, the memory system 220 may include a cache memory provided on a common integrated circuit with a central processor of the processing system 280. The memory system 220 also may include a random access main memory coupled to the processing system 280 via a memory controller, and it may also include non-volatile memory device(s) for long-term storage.

The processing system 280 may execute a variety of programs during operation, including an operating system 210 and one or more media items 114. For example, the device 200 may execute an item rendering application 272 and possibly other applications. The item rendering application 272 may manage download, decoding, and synchronized output of media item 114. The item rendering application 272 may define a set of synchronization controls 278 for management of the application. Thus, synchronization controls may vary according to the output use case for which the device 200 is applied.

Figure 3:
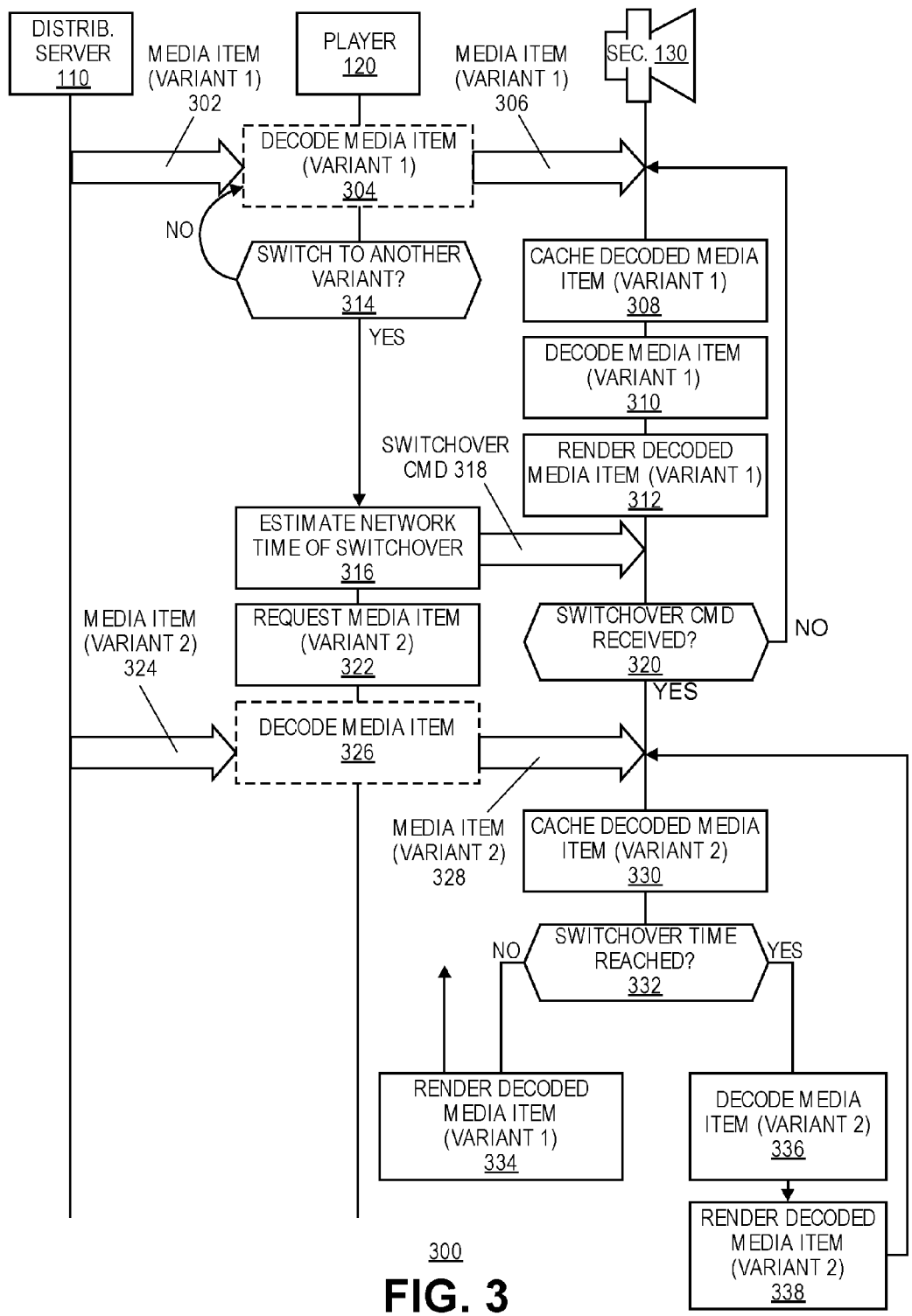
FIG. 3 shows a method for switching and synchronizing media output, according to an aspect of the disclosure.

FIG. 3 shows a method 300 for synchronizing media switches, according to an embodiment of the present disclosure. A player 120 may download a first variant of a media item 114 from the distribution server 110 (box 302). The player 120 may decode and, if appropriate to the player's type, render the media item locally (box 304). The player 120 also may transmit the coded first variant of the media item 116.1 to a secondary device 130 that is to play the media item (box 306). In parallel, the secondary device 130 may receive the coded media data from the player 120 and may cache the first variant of the media item 116.1 in a memory (box 308). The secondary device 130 may decode received coded data from the player 120 (box 310) and render the media (box 312). The player 120 and secondary device 130 may repeat operation of boxes 304 and 308-312 until a switchover event occurs.

A switchover event may occur when the player 120 decides to switch to another variant of the media (box 314). When the player 120 decides to switch to a second variant of the media (e.g., 116.2), it may estimate a time at which the switchover is to be performed (box 316) and may communicate the time to the secondary device(s) (msg. 318). The player 120 may request (box 322) and begin a download of the next variant from the distribution server 110 (box 324). Upon receiving the next variant, the player 120 may decode and render that variant locally (box 326). The player 120 also may transmit the coded second variant of the media item 116.2 to a secondary device 130 that is to play the media item (box 328).

As mentioned, the player 130 may repeat the operation of boxes 308-312 until a switchover event occurs, which is represented by the switchover command message 318. When the secondary device 130 determines that a switchover command has been received (box 320), it may begin to receive coded media generated from the new variant of the media item (msg. 328). The secondary device 130 may receive and store the second variant in a cache (box 330). The secondary device 130 may determine whether the switchover time has been reached (box 332). If the switchover time has not been reached, the secondary device 130 may render the cached data of the first variant of the media item (box 334). After the switchover time has been reached, the secondary device 130 may decode the coded data of the second variant 116.2 (box 336), and render the cached data of the second variant of the media item 116.2 (box 338).

In one aspect, the determination to switch to another variant of the media item 114 may be made based on a variety of operating factors. For example, the player 120 may determine to switch variants based on a change in communication bitrate between the player 120 and the network 140 and/or between the connection between the player 120 and any secondary devices 130; if the player 120 detects that the bitrate connection has dropped to a level insufficient to support the rendering of the first variant of the media data 116.1, it may switch to a lower bitrate. Similarly, if processing resources at the player 120 (or a secondary device) change due to the start or conclusion of other processes executing on the player 120, the player 120 may switch to a variant that is a better match to the new level of processing resources that are available for decoding.

In another aspect, the message 318 may identify a network time, as established with a network time reference 145, when the switchover is to be performed, and may identify a media time that is to be played at the switchover time. In another aspect, the secondary devices 130 may use the media time and shared time identifiers to correlate a point in the media item 114 to a network time. This correlation, used in conjunction with the playback rate, may allow the secondary device 130 to identify which elements of the media item 114 are to be rendered in the future.

In another embodiment, the switchover command may include a notification of the time at which the secondary device 130 may begin receiving a second variant of the media (e.g., 116.2) and at which to begin rendering the second variant of the media. The switch time may be estimated based on a network-to-media time translation, and may use an algorithm to determine, for example, where on an audio ramp curve to execute the switch to another media variant. The switching of media variants may be executed as a crossfade from one variant to another, meaning the first media variant may be scheduled to ramp down during a period when another media variant is scheduled to ramp up. The secondary devices 130 may send an acknowledgment to the player 120, or the switching may be done with brute force by the player 120 without any acknowledgment or handshaking between the player 120 and any secondary devices 130.

In an embodiment, the second variant of the media item may be rendered at zero volume until the switchover time and/or until any remaining first variant of the media in the memory has been rendered. Alternatively, the first variant may be rendered at a decreasing volume while the second variant is rendered at an increasing volume until the switchover time is reached (box 332), and only the second variant is rendered (box 336). The time when the second variant media begins to be rendered at a positive volume may be associated with the network time reference 145.

In another embodiment, the player 120 and/or secondary devices 130 may not immediately render the second variant of the media item. For example, the secondary devices 130 may begin to receive the second variant media 116.2 from the player 120 while there is still some amount of first variant media 116.1 stored in memory of the secondary devices 130. In addition, the player 120 may wait enough time for the switchover so that the secondary devices 130 may render the remaining first variant media 116.1. The switchover time may also allow the secondary devices 130 enough time to store some amount of second variant media in a memory before rending the second variant media 116.2 at all or at a volume greater than zero.

Figure 4:
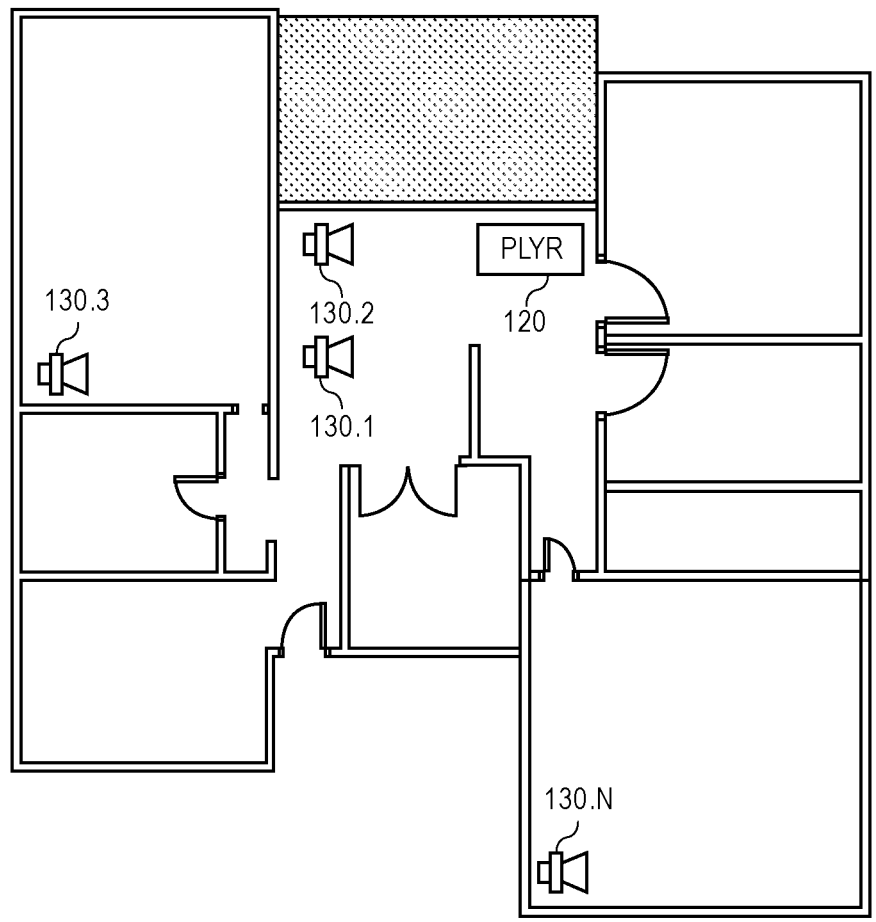
FIG. 4 illustrates a possible use case for the system of FIG. 1, according to an aspect of the disclosure.

FIG. 4 illustrates a possible use case 400 for system 100 (FIG. 1). The use case 400 may include the player 120 and multiple secondary devices 130 arranged in different locations, according to an aspect of the disclosure. In one aspect, the player 120 is the primary device which receives all media to be rendered from the distribution server 110, and controls the rendering of the media at the secondary devices 130 by transmitting the media individually to each secondary device 130. In one aspect, the player 120 may be a control node such as an Apple TV, an iPhone, a stereo receiver, a smart TV, a wireless transceiver device, or any other device cable of sending and receiving media.

The secondary devices 130 may be speakers, televisions, tablets, smart phones, or other output devices, and may connect wirelessly to the player 120 via an area connection, which could be Wi-Fi, Wide Area Network, Bluetooth, or the like. The player 120 may transmit the media to each secondary device 130 in various locations and in a manner which produces a synchronized output in each location of a secondary device 130. The player 120 may send coded data to the secondary devices 130 or may decode the data before sending it to the secondary devices 130. When the player 120 sends coded data to the secondary device 130, the secondary device 130 may decode the data with a decoder before rendering the data.

In one embodiment, the secondary devices 130 may all render the same, complete media output. For example, if the media output is music, each secondary device 130 could be in a different room playing the same song so that the listener may walk from room to room while hearing a continuous output of the song. Likewise, if an output is paused as a listener walks from one room to another with a secondary device 130, when audio play recommences, the output will be at the same point as it was in another room when it was paused. Alternatively, each secondary device could be rendering a different portion of the media. For example, one secondary device 130 could be rendering drums while another renders a guitar, simulating a synchronized live experience in which each secondary device 130 is playing different instruments or sounds of the same song at the same time. Such an aspect may represent a surround sound output.

Similarly, in another example, the media could be both audio and video. If a user walks from one room with a television to another, he/she may pause the media rendering while walking to the other room, and recommence output at another secondary device 130 without missing or repeating any media output. Similarly, a mix of video and audio may be synchronized. For example, at least one of the secondary devices 130 could be a video display such as a television, and at least one of the secondary devices 130 could be an audio output such as a speaker. In such an aspect, a user may be watching the video on one secondary device 130 in one room, and then walk to another room with a secondary device 130 functioning as a speaker only. The audio for the speaker should synchronize with the video and/or audio of the television in the other room. Such aspects may allow a viewer to avoid seeing or hearing an output on any secondary device 130 before any other secondary device 130.

In another aspect, the player 120 may control multiple secondary devices 130 which may render the media in sync. For example, the player 120 may be an Apple TV device which may output to one or more output displays in a bar, gym, conference room, stadium, airplane, or other location with multiple audio and/or video outputs. To avoid asynchronous output from any combination of secondary devices 130, the player 120 may use an adaptive bitrate which it may control. The player 120 may therefore alter the bitrate to ensure that each secondary device 130 is able to render the media at the exact same time. In addition, using the player 120 as a controller for multiple secondary devices 130 may have the benefit of reducing the number of connections to the distribution server 110 required to produce multiple outputs on various secondary devices 130. In such an aspect, the player 120 may alter the bitrate based on network bandwidth, latency, output capabilities, and other system parameters so that no secondary device 130 is rendering the media before or after any other secondary device 130. Likewise, playback may be synchronized across each secondary device 130. For example, if audio is paused at the player 120, it will be paused simultaneously at each secondary device 130. If playback continues, it will recommence simultaneously at each secondary device 130. Another example of such synchronization may involve enhanced playback functionality like replay, skipping forward and backward, rendering icons, widgets, and other add-ons for each secondary device 130 at the same time.

In another aspect, the secondary devices 130 may render different portions of the media. For example, in a surround sound context, each secondary device 130 may render a portion of audio output which is not necessarily the entire variant of the media. In such an example, the player 120 may need to synchronize the rendering of media even though the portions of the media are being rendered at different locations with different secondary devices 130. In this aspect, the player 120 may distribute the portions of the media to the secondary devices 130 under the same timing method of FIG. 3 so that the synchronized rendering of the various portions of the media at the secondary devices 130 results in the fully rendered media across multiple secondary devices 130.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Wireless Fidelity (Wi-Fi), Bluetooth, and/or the like, and/or a combination of two or more thereof.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any device running a common web browser (e.g., Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may be implemented in any type of mobile smartphones that are operated by any type of advanced mobile data processing and communication operating system, such as, e.g., an Apple™ iOS™ operating system.

We claim:

1. A method of switching media output, comprising:
    transmitting a first variant from a player to a secondary device; and
    upon determining a change in operating conditions, switching from a first variant of the media item to a second variant of the media item, the second variant representing the media item at a quality tier different than a quality tier of the first variant, by:
        estimating a duration of a transition period for performing the switch to the second variant;
        transmitting to the secondary device a notification of a time to switch from the first variant to the second variant, wherein the time to switch is identified with respect to a media time reference and with respect to a shared time reference;
        and
        transmitting the second variant to the secondary device.

2. The method of claim 1, wherein the operating conditions include a connection speed between the player and the secondary device.

3. The method of claim 1, wherein estimating the duration of the transition period includes scheduling a crossfade to decrease volume of the first variant while increasing volume of the second variant.

4. The method of claim 1, wherein the switching further includes requesting the second variant upon determining the change in the operating conditions.

5. The method of claim 1, wherein the transition period ends at the time to switch, and further comprising rendering any remaining first variant at zero volume after the time to switch has been reached.

6. The method of claim 5, wherein the transition period begins at the time to switch, and further comprising rendering the second variant at a non-zero volume after the time to switch has been reached.

7. The method of claim 1, wherein transmitting the second variant to the secondary device is performed during the transition period when the first variant is being rendered.

8. The method of claim 1, further comprising receiving an acknowledgment from the secondary device in response to transmitting the switch notification before transmitting the second variant.

9. The method of claim 1, further comprising altering, by the player, a connection bitrate for the secondary device and for a third device to synchronize rendering of the first variant and the second variant at each device.

10. A method of switching media output, comprising:
    upon receiving a first variant of a media item from a player, caching the first variant;
    rendering the first variant;
    in response to receiving a switchover command including a media time reference and a shared time reference, estimating a switchover time of a switchover from the first variant to a second variant of the media item, the second variant representing the media item at a quality tier different than a quality tier of the first variant, and continue rendering the first variant at least until the switchover time;
    receiving a second variant of the media item from the player;
    caching the second variant; and
    in response to the switchover time being reached, rendering the second variant.

11. The method of claim 10, wherein the switchover command includes a time to render the second variant.

12. The method of claim 10, further comprising, when the switchover command includes an identifier of a network time at which switchover occurs, reading a network time value from a network time source on a communication network.

13. The method of claim 10, further comprising transmitting an acknowledgment in response to receiving the switchover command.

14. The method of claim 10, wherein estimating the switchover time includes scheduling a crossfade to decrease volume of the first variant while increasing volume of the second variant.

15. The method of claim 10, wherein the second variant is received while the first variant is being rendered.

16. The method of claim 10, further comprising rendering any remaining cached portions of the first variant at zero volume after the switchover time has been reached.

17. The method of claim 16, further comprising rendering the second variant at non-zero volume after the switchover time has been reached.

18. An apparatus for switching media output, comprising:
a transmitter to transmit one or more variants of a media item; and
a memory to store instructions that, when executed by a processor, cause the apparatus to:
  transmit the first variant to a secondary device; and
  upon determining a change in operating conditions, switch from a first variant of the media item to a second variant of the media item, the second variant representing the media item at a quality tier different than a quality tier of the first variant, by:
    estimating a duration of a transition period for performing the switch to the second variant;
    transmitting to the secondary device a notification of a time to switch from the first variant to the second variant, wherein the time to switch is identified with respect to a media time reference and with respect to a shared time reference;
    and
    transmitting the second variant to the secondary device.

19. An apparatus for switching media output, comprising:
a receiver to receive one or more variants of a media item; and
a memory to store instructions that, when executed by a processor, cause the apparatus to:
  upon receiving a first variant of a first quality tier of the media item, caching the first variant;
  rendering the first variant;
  in response to receiving a switchover command including a media time reference and a shared time reference, estimating a switchover time of a switchover from the first variant to a second variant of a second quality tier different from the first quality tier of the media item, and continue rendering the first variant until the switchover time;
  receiving the second variant of the media item;
  caching the second variant; and
  in response to the switchover time being reached, rendering the second variant; and wherein the first variant corresponds to a first quality tier of the media item and the second variant corresponds to a second quality tier of the media item.

* * * * *